United States Patent [19]
Maeda

[11] Patent Number: 5,517,330
[45] Date of Patent: May 14, 1996

[54] MINIMIZATION OF DIFFERENTIAL BOW IN MULTIPLE BEAM SCANNING OPTICAL SYSTEMS

[75] Inventor: Patrick Y. Maeda, Redondo Beach, Calif.

[73] Assignee: Xerox Corporation, Stamford, Conn.

[21] Appl. No.: 329,011

[22] Filed: Oct. 25, 1994

Related U.S. Application Data

[63] Continuation of Ser. No. 135,641, Oct. 14, 1993.

[51] Int. Cl.[6] .............................. H04N 1/04; G02B 26/08
[52] U.S. Cl. .......................... 358/481; 358/480; 359/196; 359/197; 359/208; 359/204; 348/203
[58] Field of Search ................................. 358/480, 481; 359/219, 210, 216, 217, 196, 218, 219, 206, 207, 208, 197, 204; 250/234, 235, 236, 578.1; 346/108; 348/203

[56] References Cited

U.S. PATENT DOCUMENTS

| | | | |
|---|---|---|---|
| 4,139,257 | 2/1979 | Matsumoto | 348/203 |
| 4,247,160 | 1/1981 | Brueggemann | 359/208 |
| 4,508,422 | 4/1985 | Karlsson | 348/203 |
| 4,512,625 | 4/1985 | Brueggemann | 359/208 |
| 4,805,974 | 2/1989 | Brueggemann et al. | 350/6.7 |
| 5,333,067 | 7/1994 | Chung | 348/203 |

*Primary Examiner*—Edward L. Coles, Sr.
*Assistant Examiner*—Allan A. Esposo
*Attorney, Agent, or Firm*—Fariba Rad

[57] ABSTRACT

A raster scanning system is disclosed which utilizes a post polygon optics which generates a field curvature to substantially reduce a differential bow. The post polygon optics of this invention comprises a first lens, a second lens and a wobble correction mirror. The second lens and the wobble correction mirror generate a field curvature to reduce the differential bow and the combination of the first lens, second lens and the wobble mirror correction minimizes the generated field curvature.

15 Claims, 6 Drawing Sheets

5,517,330

MINIMIZATION OF DIFFERENTIAL BOW IN MULTIPLE BEAM SCANNING OPTICAL SYSTEMS

This is a continuation of application Ser. No. 08/135,641, filed Oct. 14, 1993.

BACKGROUND OF THE INVENTION

This invention relates to a raster scanner, and more particularly, to a raster scanner system which utilizes optical elements for compensating a differential bow of a scan line.

Referring to FIG. 1, a conventional raster scanner system 10 utilizes a light source 12, a collimator 14, pre-polygon optics 16, a multi-faceted rotating polygon mirror 18 as the scanning element, post polygon optics 20 and a photosensitive medium 22. The light source 12, which can be a laser source, produces a light beam 24 and sends it to the rotating polygon mirror 18 through the collimator 14 and the pre-polygon optics 16. The collimator 14 collimates the light beam 24 and the pre-polygon optics 16 focuses the light beam in the sagittal or cross scan plane onto the rotating polygon mirror 18.

The rotating polygon 18 has a plurality of facets 26, each of which is a plane mirror. The facets 26 of the rotating polygon mirror 18 reflect the light beam 24 and also cause the reflected light 24 to revolve about an axis near the reflection point of the facet 26 of the rotating polygon mirror 18. This reflected light beam can be utilized through the post polygon optics 20 to scan a document at the input end of an imaging system as a raster input scanner or can be used to impinge upon a photographic film or a photosensitive medium 22, such as a xerographic drum (photoreceptor), at the output of the imaging system.

The post polygon optics 20 comprises two spherical lenses 28 and 30, which both together are called F-theta lens, and a wobble correction mirror 32. The lens 28 is spherical concave on the side which receives the light beam and planar on the side that the light beam exits the lens and the lens 30 is planar on the side which receives the light beam and spherical convex on the side that the light beam exits the lens. The wobble correction mirror 32 is a concave cylindrical mirror in the cross scan plane.

In real world situations, a raster scanner typically includes a number of lenses and mirrors to accommodate a specific design. Unavoidable imprecision in the shape and/or mounting of these optical elements will inevitably introduce certain anomalies in the quality of the scan line on the photoreceptor. One of such anomalies is a bow.

Bow is an undesirable character of a scan line which does not form a straight line and bows about a central midpoint. An example of a bow is shown by scan line 34 in FIG. 2. Depending on the types of imprecision in the construction of the apparatus, the bow may bend in either direction relative to a bow free line. A bow 34 (FIG. 2) situated downward is called a frown and a bow 36 (FIG. 3) situated upward is called a smile. Typically a bow happens when the center ray of a light beam scanning a lens does not scan along the optical axis of the lens. The farther the center ray of a beam is from the optical axis of the lens, the more the curvature of the bow.

There is yet another undesirable character which is called a differential bow. A differential bow happens in multi-beam raster scanners in which the light beams are nominally off-axis in the cross scan direction. For example, referring to FIG. 4, if the bow of one beam happens to be a smile while the bow of the other beam happens to be a frown, then the two beams create two lines 38 and 39 in which the separation between the two beams varies across the scan. This phenomenon is called a differential bow. It should be noted that a differential bow can have different shapes such as two scan lines with the same shape bow but a different amount of bow on each scan line or two scan lines with a smile on the top scan line and a frown on the bottom scan line. It is desirable to have all the scan lines straight and parallel so that the beam separation across the scan line would be uniform and therefore, the differential bow would be eliminated.

SUMMARY OF THE INVENTION

In accordance with the present invention, by generating a field curvature in a raster scanner a differential bow between two scan lines can substantially be reduced. However, it is also desirable to reduce the field curvature. The post polygon optics of this invention utilizes optical elements which are capable of substantially reducing both differential bow and field curvature. The post polygon optics of this invention comprises two lenses and a wobble correction mirror. The first lens has a spherical concave surface on the side which receives the light beams and a cross scan cylindrical convex surface on the side that the light beams exit the lens. The second lens has a cross scan cylindrical concave surface on the side which receives the light beams and a spherical convex surface on the side that the light beams exit the lens. The wobble correction mirror has a cross scan cylindrical concave surface.

DESCRIPTION OF THE PREFERRED EMBODIMENT

Figure 5:
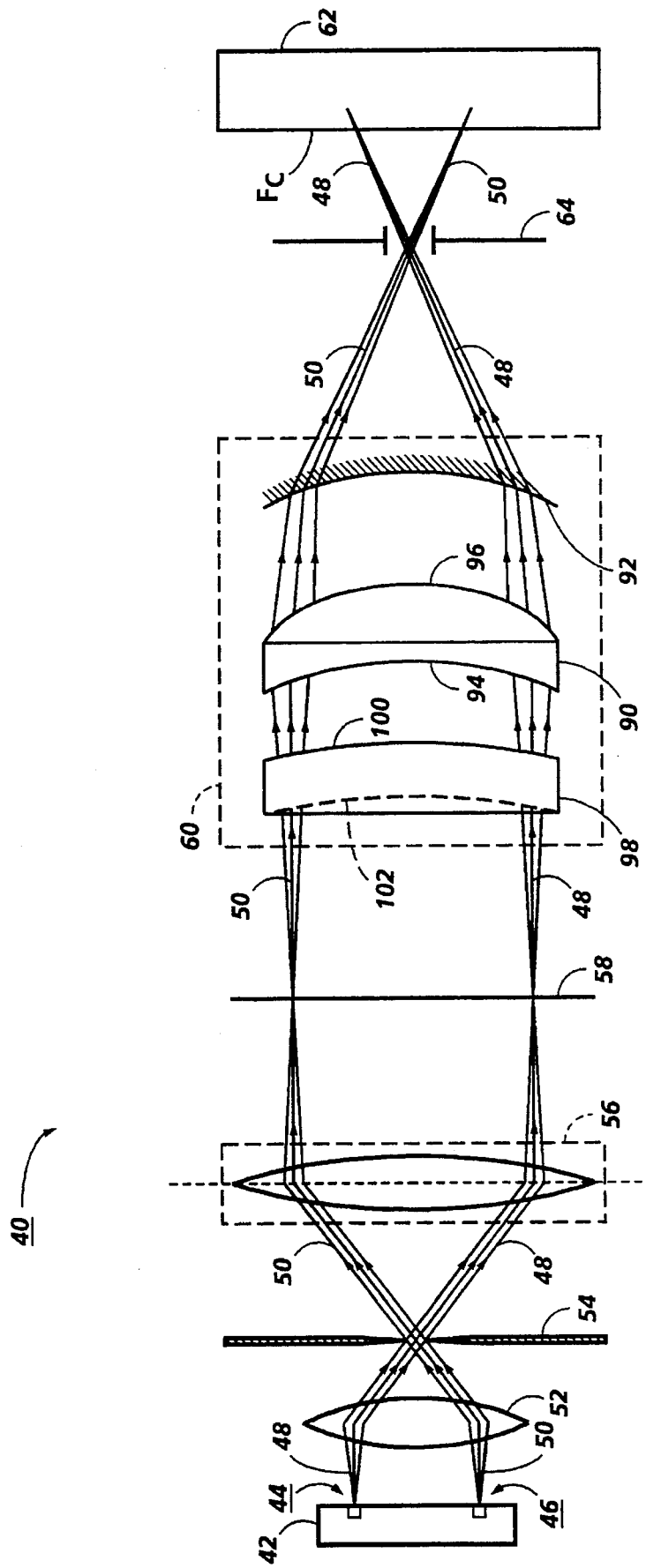
FIG. 5 is a cross scan or sagittal view of the raster output scanner of this invention.

Referring to FIG. 5, there is shown a cross scan or sagittal view of a raster scanner 40 utilizing a method suggested by this invention to correct the differential bow. The raster scanning system 40 contains a laser light source 42 which has two lasing diodes 44 and 46 for emitting two light beams 48 and 50. The two light beams 48 and 50 pass through a collimator 52 to be collimated and then they pass through an aperture 54. Aperture 54 clips the two light beams 48 and 50 to the desired diameter. The two clipped light beams 48 and 50 pass through a pre-polygon optics 56 before striking a facet 58 of a rotating polygon mirror. For simplicity, the facet 58 of the rotating polygon mirror is shown as a line and the light beams reflected from the polygon are unfolded. Post polygon optics 60 receive the two light beams reflected by the facet 58 and image them onto the a photoreceptor 62 while passing through exit pupil 64.

In this invention it is suggested that by generating a cross scan field curvature Fc, the differential bow can be substantially reduced. The suggested field curvature of this invention is being generated by one or a combination of the optical elements used in the post polygon optics. The generation of the field curvature through the optical elements of the post polygon optics will be discussed in detail hereinafter. However, in order to apprehend this invention, it is necessary to study the effects of the field curvature on the a differential bow.

Figure 6:
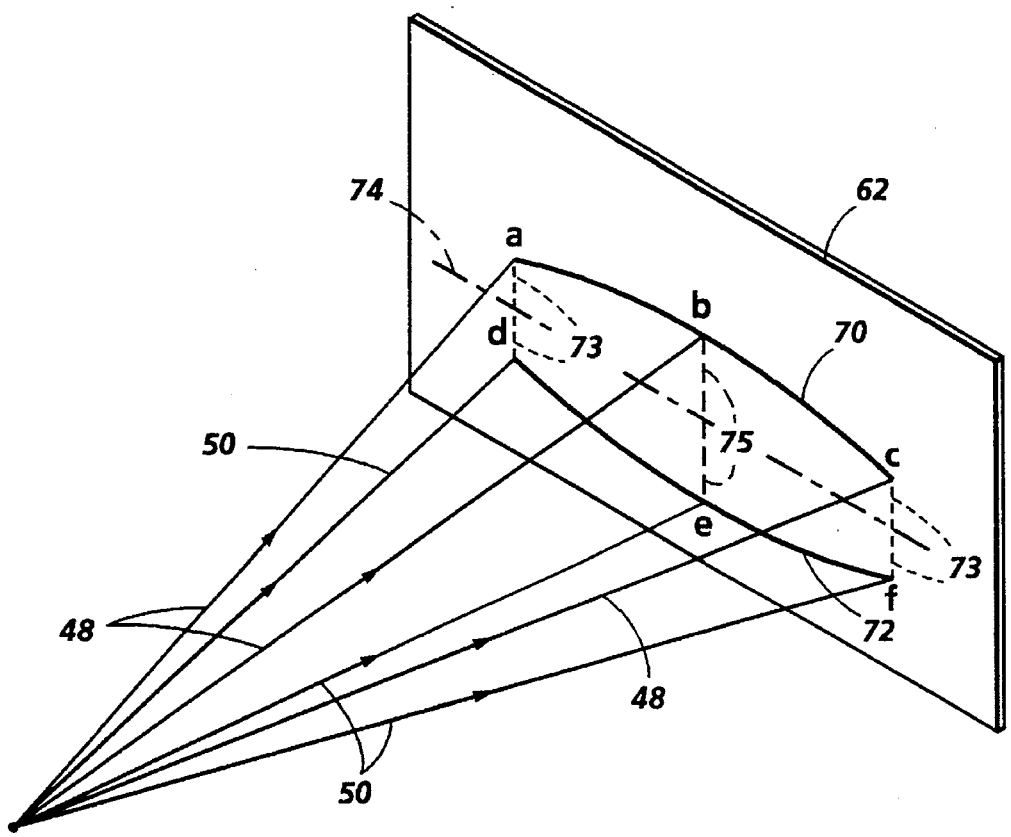
FIG. 6 shows a magnified and a perspective view of a portion of FIG. 5 to the right (downstream) of the exit pupil 64.

Referring to FIG. 6, there is shown a magnified and a perspective view of a portion of FIG. 5 to the right (downstream) of the exit pupil 64. For simplicity, the two light beams 48 and 50 are shown only with their center rays. Assuming there is no field curvature, the two light beams 48 and 50 scan two lines along the lines 70 and 72 respectively. The light beam 48 scans the line 70 from the start of the scan point a to the end of the scan point c while passing through the center of the scan point b. Also, the light beam 50 scans the line 72 from the start of the scan point d to the end of the scan point f while passing through the center of the scan point e. As it can be observed, the points a, c, d and f have a shorter distance 73 from the center line 74 than points b and e. In other words, if the distance between each point on the scan line and the center line 74 is called the elevation of that point, the elevation 75 at the center of the scan is more than the elevation 73 at the start and the end of scan and there is a differential bow between the lines 70 and 72.

Figure 7:
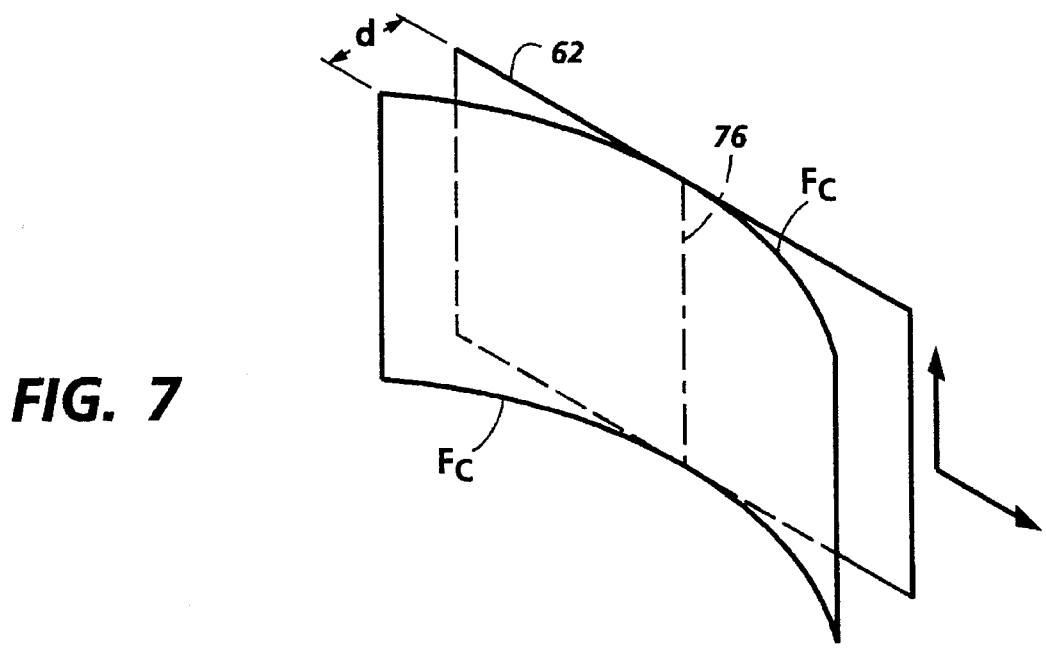
FIG. 7 shows a perspective view of a fast scan field curvature used in the raster scanner of this invention.

Referring to FIG. 7, there is shown a perspective view of a cross scan field curvature Fc used in the raster scanner 40 of this invention. In this invention, by generating a field curvature Fc in the cross scan plane, the light beams focus on the field curvature. For the purpose of discussion, the field curvature Fc is designed to have a common line with the photoreceptor on the cross scan plane which is coincident with the center of the scan of the scan lines. However, it should be noted that depending on the required correction for any differential bow, the field curvature Fc can be designed to cross the photoreceptor plane or can be designed to be away from the photoreceptor plane. In FIG. 7, since the light beams focus on the field curvature and since at the center of the scan, the field curvature Fc coincides with the photoreceptor plane 62, the field curvature Fc does not affect the center of the scans of the different scan lines such as points b and e (FIG. 6).

Figure 8:
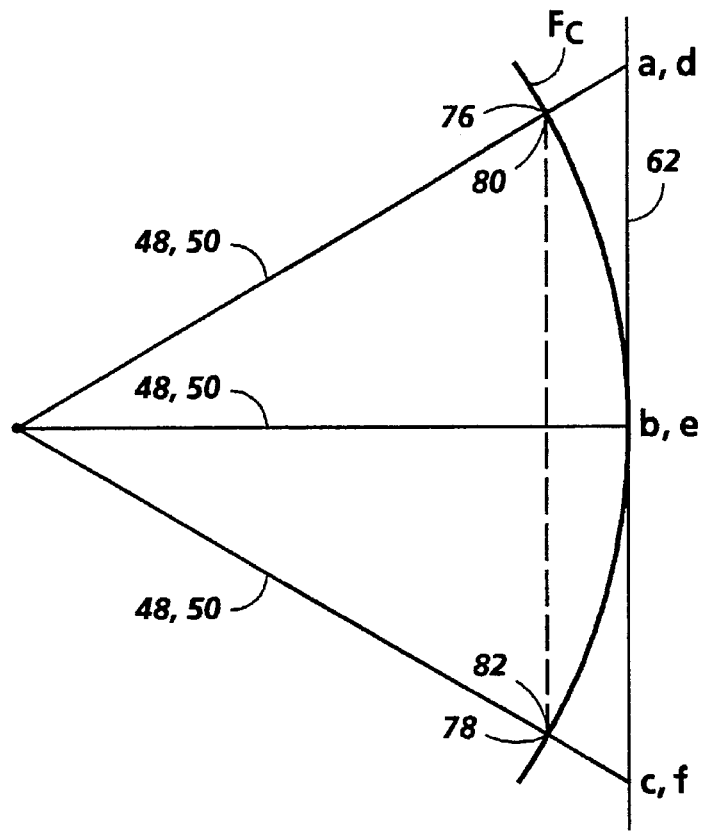
FIGS. 8 shows a magnified portion of FIG. 5, to the right (downstream) of the exit pupil 64, in fast scan plane.
Figure 9:
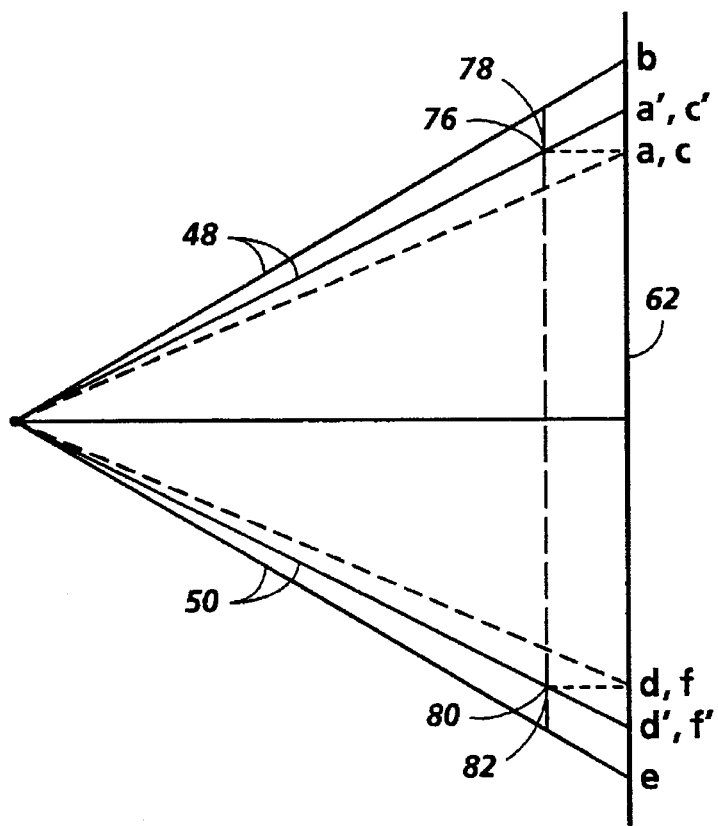
FIGS. 9 shows a magnified portion of FIG. 5, to the right (downstream) of the exit pupil 64, in cross scan plane.

Referring to both FIGS. 8 and 9, there are shown a magnified portion of FIG. 5, to the right (downstream) of the exit pupil 64, in the fast scan plane (FIG. 8) and in the cross scan plane (FIG. 9). In both FIGS. 8 and 9, for simplicity, the light beams are shown only with their center rays.

For any point other than the center of the scan the light beam focuses on the field curvature before it reaches the photoreceptor plane 62. For example, the light beam 48 at the start of the scan, instead of focusing at point a, focuses at point 76 on the field curvature Fc and at the end of the scan, instead of focusing at point c, focuses at point 78 on the field curvature Fc. Also, the light beam 50 at the start of the scan instead of focusing at point d it focuses at point 80 on the field curvature FC and at the end of the scan instead of focusing at point f it focuses at point 82 on the field curvature Fc. Points 76, 78, 80 and 82 are at the same elevation relative to the center line 74 as the points a, c, d and f respectively (FIG. 9). Therefore, when the light beams, which focus on points 76, 78, 80 and 82, reach the photoreceptor plane 62 they will generate spots a', c', d' and f' respectively which have a higher elevation relative to the center line 74 when compared to points a, c, d and f (FIG. 9).

As the light beam scans along the scan line and it becomes closer to the center of the scan, the field curvature will be closer to the photoreceptor plane and therefore, the field curvature causes the elevation of the spot to change by a smaller amount. As a result, the spots closer to the center of the scan which need less bow correction, receive less change in their elevations. As the light beam moves away from the center of the scan, the distance between the field curvature Fc and the photoreceptor plane 62 becomes large. Again the spots closer to the center of the scan which need less correction, receive less change in their elevations and as the light beam moves away from the center of the scan, the spots closer to the end of the scan which require more correction, receive more change in their elevations.

Figure 10:
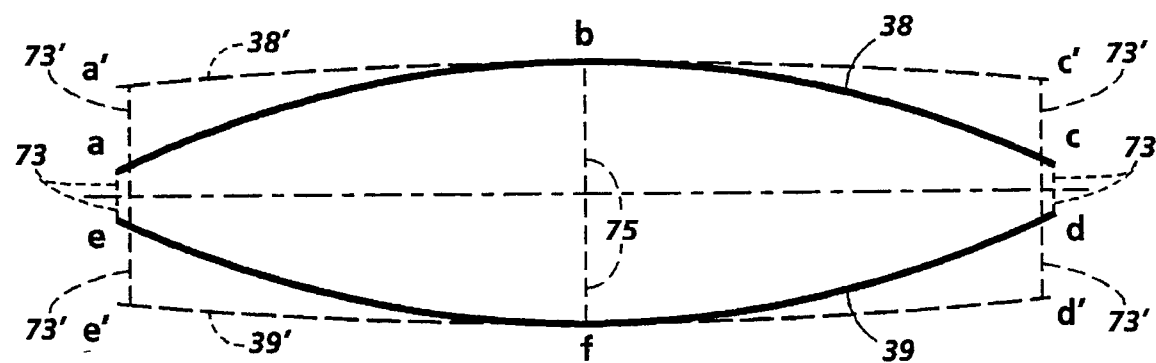

Therefore, by creating a field curvature Fc, the elevations of the points can be increased as needed. Also, Referring to FIG. 10, since the elevation 75 of the centers b and f of the scan are not changed, the difference between the elevation 75 of the centers b and f of the scan compared to the elevation 73' of the start of the scans a' and e' or the elevation 73' of the end of the scans c' or d' are reduced which in turn reduce the differential bow. Therefore, by a proper design of the field curvature, the differential bow can be substantially reduced. FIG. 10 shows the differential bow between the scan lines 38 and 39 in a raster scanning system without a field curvature. FIG. 10 also shows the reduced differential bow between the lines 38' and 39' in the same raster scanning system with a field curvature.

However, it should be noted that when a light beam focuses on the field curvature, by the time it reaches the photoreceptor plane the spot generated on the photoreceptor plane is defocused, but since the field curvature is very close to the photoreceptor plane, the amount of defocus is negligible.

It should also be noted that the cross scan field curvature does not affect the light beam in the fast scan plane and therefore, the start of the scan and the end of the scan in the fast scan plane are not affected.

The field curvature of this invention is also capable of reducing the differential bow even if the two scan lines have the same shape bow. If both scan lines have frown shaped or smile shaped bows, it means that both light beams are on one side of the optical axis and therefore both light beams will be corrected in the same direction which will reduce the differential bow between the two scan lines.

Figure 1:
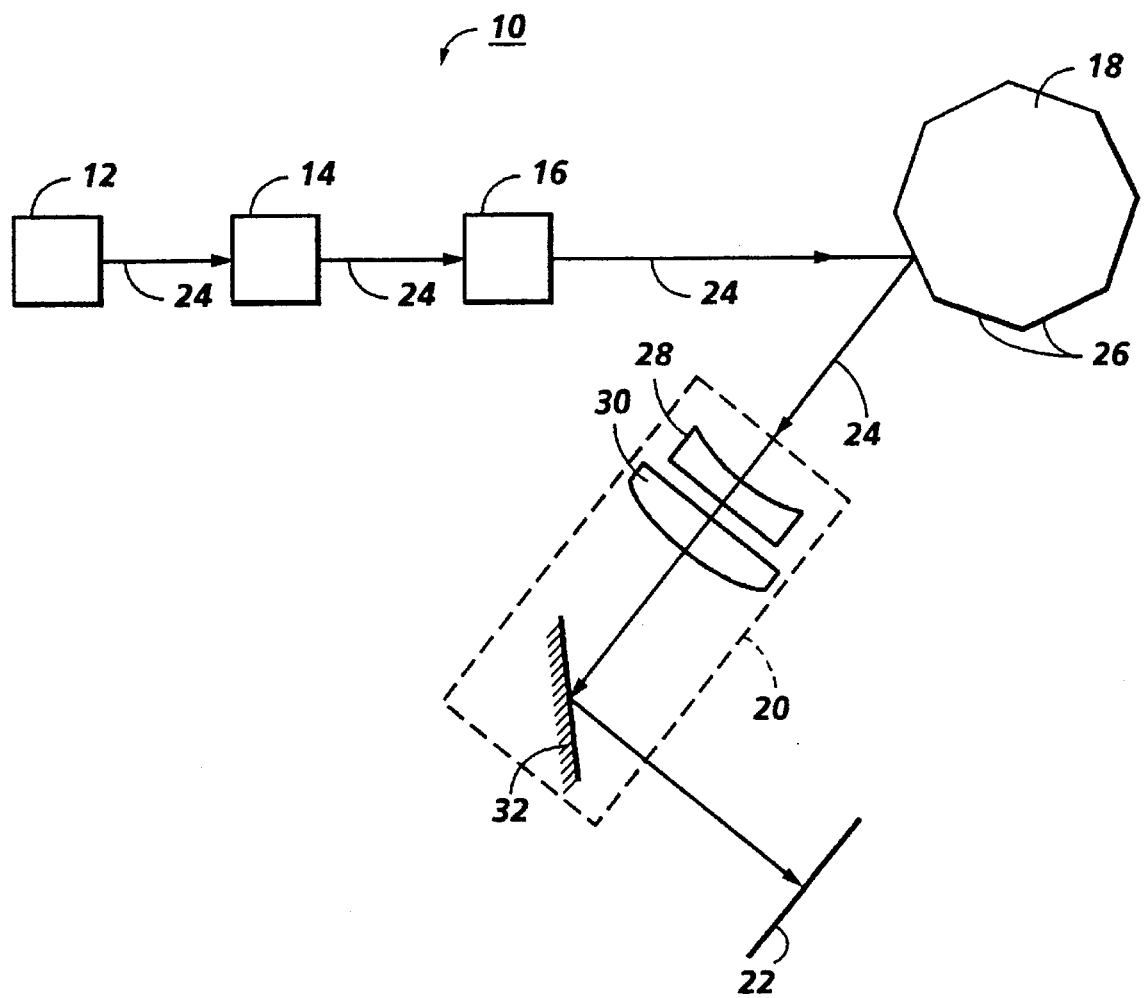
FIG. 1 is a top view of a prior art raster output scanner.
Figure 2:
FIG. 2 shows a bow of a scan line situated downward which is called a frown.
Figure 3:
FIG. 3 shows a bow of a scan line situated upward which is called a smile.
Figure 4:
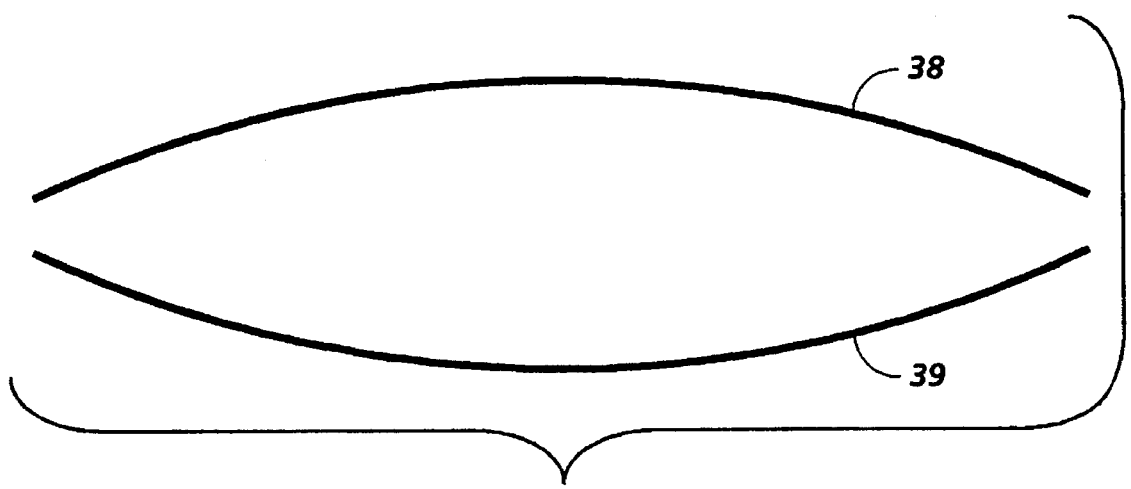
FIG. 4 shows a differential bow between two scan lines.

Referring back to FIG. 5, a field curvature is generated by the optical elements of the post polygon optics 60. By replacing the lens 30 and the wobble correction mirror 32 (FIG. 1) of the prior art with lens 90 and the wobble correction mirror 92, a cross scan field curvature can be generated. It should be noted that the only difference between the wobble correction mirror 32 and the wobble correction mirror 92 is the radius of the two mirrors. By selecting a proper radius for the wobble correction mirror 92 in conjunction with the lens 90, a proper field curvature can be generated. The lens 90 on the side 94, which receives the light beams, is cylindrical in the cross scan plane and planar in the fast scan plane and on the side 96, that the light beams exit the lens, is spherical. The cross scan cylindrical surface 94 is concave and the spherical surface 96 is convex. The wobble correction mirror 92 is a cross scan cylindrical concave mirror. The combination of lens 90 and wobble correction mirror 92 generates the desired amount of cross scan field curvature.

However, if the radius of the field curvature becomes smaller, it may correct the differential bow at the cost of a larger spot defocus. As long as the spot defocus is within a tolerable range, the field curvature can be used. However, if the spot defocus becomes intolerable, the radius of the field curvature should be increased to decrease the distance d (FIG. 7) between the field curvature and the photoreceptor plane.

Again referring back to FIG. 5, one approach to correct the differential bow and reduce the field curvature is to replace lens 28 (FIG. 1) with lens 98. The lens 98 is lens 28 (FIG. 1) with a cross scan cylindrical convex surface 100 added to the planar side of the lens 28. Lens 98 has a spherical concave surface 102 on the side which receives the light beams and a cross scan cylindrical convex surface 100 on the side that the light beams exit the lens.

It should be noted that the spherical surface 102 of lens 98 and the spherical surface 96 of lens 90 can also be designed to be cylindrical.

Lens 90 and the wobble correction mirror 92 can be designed to correct the differential bow at the cost of adding a cross scan field curvature. However, the cross scan cylindrical concave surface 100 of lens 98 provides an extra degree of freedom in designing a raster scanner which allows simultaneous correction of differential bow and cross scan field curvature.

What is claimed is:

1. A raster scanning system comprising:

two light sources each emitting a light beam along a path;

a medium;

scanning means located in the path of the light beams from said two light beams and being so constructed and arranged to scan the light beams in a tangential plane across said medium;

optical means located in the path of the light beams from said scanning means and having a cross scan cylindrical concave surface and a spherical convex surface;

a wobble correction mirror located in the path of the light beams from said optical means and having a cross scan cylindrical concave surface to reflect the light beams onto said medium;

said optical means being arranged in such a manner that said cross scan cylindrical concave surface receives the light beams from said scanning means and the light beams exit said spherical convex surface to the wobble correction mirror; and said optical means and said wobble correction mirror being so constructed and arranged relative to each other for generating a field curvature to substantially reduce differential bow between the light beams.

2. A raster scanning system comprising:

two light sources each emitting a light beam along a path;

a medium;

scanning means located in the path of the light beams from said two light beams and being so constructed and arranged to scan the light beams in a tangential plane across said medium;

a first optical means and a second optical means;

a wobble correction mirror;

said first optical means located between said scanning means and said second optical means and having a spherical concave surface for receiving the light beams from said scanning means and a cross scan cylindrical convex surface through which the light beams exit;

said second optical means located between said first optical means and said wobble correction mirror and having a cross scan cylindrical concave surface for receiving the light beams from said first optical means and a spherical convex surface through which the light beams exit;

said wobble correction mirror located in the path of the light beams from said second optical means and having a cross scan cylindrical concave surface to reflect the light beams onto said medium;

said second optical means and said wobble correction mirror being so constructed and arranged relative to each other for generating a field curvature to substantially reduce differential bow between the light beams; and said first optical means, said second optical means and said wobble correction mirror being so constructed and arranged relative to each other to substantially reduce the generated field curvature.

3. The raster scanning system recited in claim 1, wherein the concave surface of said first optical means is cylindrical.

4. The raster scanning system recited in claim 1, wherein the convex surface of said second optical means is spherical.

5. The raster scanning system recited in claim 1, wherein the convex surface of said second optical means is cylindrical.

6. A raster scanning system for reducing the differential bow between two light beams by generating a field curvature comprising:

two light sources each emitting a light beam along a path;

a medium;

scanning means located in the path of the light beams from said two light sources and being so constructed and arranged to scan the light beams in a tangential plane across said medium;

a first optical means and a second optical means;

a cross scan cylindrical concave mirror;

said first optical means located between said scanning means and said second optical means and having a concave surface for receiving the light beams from said scanning means and a cross scan cylindrical convex surface through which the light beams exit;

said second optical means located between said first optical means and said mirror and having a cross scan cylindrical concave surface for receiving the light beams from said first optical means and a convex surface through which the light beams exit;

said mirror located in the path of the light beams from said second optical means and having a cross scan cylindrical concave surface to reflect the light beams onto said medium; and said second optical means and said mirror being so constructed and arranged relative to each other for generating a field curvature to substantially reduce differential bow between the light beams; and said first optical means, said second optical means and said mirror being so constructed and arranged relative to each other to substantially reduce the generated field curvature.

7. The raster scanning system recited in claim 6, wherein the concave surface of said first optical means is spherical.

8. The raster scanning system recited in claim 6, wherein the concave surface of said first optical means is cylindrical.

9. The raster scanning system recited in claim 6, wherein the convex surface of said second optical means is spherical.

10. The raster scanning system recited in claim 6, wherein the convex surface of Said second optical means is cylindrical.

11. A raster scanning system for reducing the differential bow between two light beams by generating a field curvature comprising:

two light sources each emitting a light beam along a path;

a medium;

scanning means located in the path of the light beams from said two light sources and being so constructed and arranged to scan the light beams in a tangential plane across said medium;

a first optical means and a second optical means;

a cross scan cylindrical concave mirror;

said first optical means located between said scanning means and said second optical means and having a concave surface for receiving the light beams from said scanning means and a cross scan cylindrical convex surface through which the light beams exit;

said second optical means located between said first optical means and said mirror and having a cross scan cylindrical concave surface for receiving the light beams from said first optical means and a convex surface through which the light beams exit;

said mirror located in the path of the light beams from said second optical means and having a cross scan cylindrical concave surface to reflect the light beams onto said medium; and said first optical means, said second optical means and said mirror being so constructed and arranged relative to each other for substantially reducing differential bow between the light beams by generating and optimizing a field curvature.

12. The raster scanning system recited in claim 11, wherein the concave surface of said first optical means is spherical.

13. The raster scanning system recited in claim 11, wherein the concave surface of said first optical means is cylindrical.

14. The raster scanning system recited in claim 11, wherein the convex surface of said second optical means is spherical.

15. The raster scanning system recited in claim 11, wherein the convex surface of said second optical means is cylindrical.

* * * * *